April 30, 1957 J. E. BANCROFT 2,790,875

RELAY INCORPORATING PRINTED CIRCUIT

Filed March 24, 1953

INVENTOR.
James E. Bancroft
BY
Churchill, Rich, Weymouth & Engel
Attorneys

United States Patent Office
2,790,875
Patented Apr. 30, 1957

2,790,875

RELAY INCORPORATING PRINTED CIRCUIT

James Earl Bancroft, Jamaica, N. Y., assignor to Allied Control Company, Inc., New York, N. Y., a corporation of New York Application March 24, 1953, Serial No. 344,445

3 Claims. (Cl. 200—87)

This invention relates to electric control systems, more particularly to control systems incorporating relays or other automatically operated switching means. The invention is especially useful in its application to control panels, for example elevator control panels, and other such assemblies utilizing a large number of relays, to which use, however, it is not restricted.

In many types of electrical apparatus it is necessary to employ a multiplicity of separate but related circuits which must be closed or opened in predetermined related sequences. Examples of such apparatus are push-button elevators, automatic business machines, and automatic telephone connections. In the past, control panels for such apparatus have required extensive hand wiring. Such wiring for a single elevator control panel, for example, may require 200 man hours. Separate automatic switches or relays, carrying the terminals of the several circuits, have heretofore been mounted on the control panels of the apparatus and then the separate switch or relay actuating circuits have been wired up in the usual manner.

More recently, various kinds of electrical circuits have been formed as so-called "printed" circuits, in which conductors are formed on an insulating base in known manner, and the complication and wiring cost of such circuits have thus been materially reduced. However, automatic switches or relays have continued to be mounted and connected as heretofore, and the necessity has remained for wiring the contact terminals of the relays to the terminals of the printed circuits where such have been used.

According to the invention, I mount a modified form of relay directly upon a printed circuit control panel in a simple and effective manner, thus greatly simplifying the construction, reducing the cost and eliminating nearly all wiring labor. The relay embodies but one set of contacts. Those are the movable contacts for opening and closing the circuit. The fixed contacts are provided by the printed circuit itself. Furthermore, the invention may make it possible for the relay to close one or more printed circuits when it is energized and to close one or more different printed circuits when it is de-energized.

The invention will best be understood from the present preferred embodiment thereof illustrated in the accompanying drawings, in which.

Figure 1:
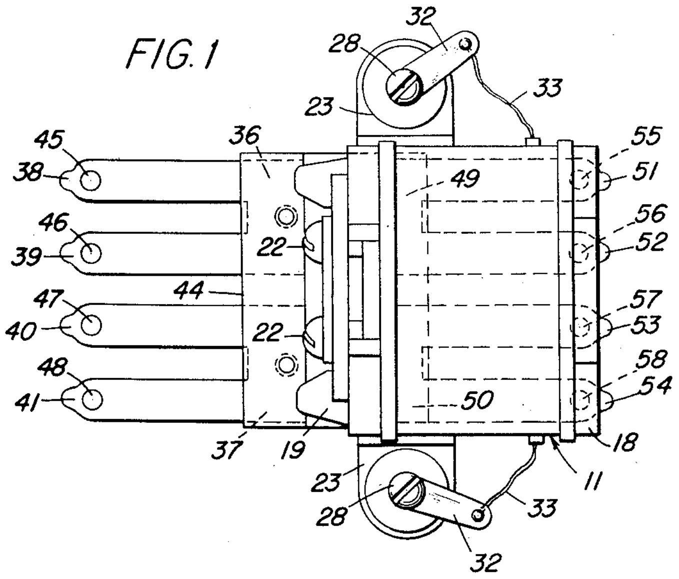
Fig. 1 is a top plan view of modified relay constructed and arranged according to the invention.

In the drawings, there is shown a portion of an electrical control system comprising a printed circuit control panel 10, to which a modified relay 11 is attached in a manner later to be described.

The printed circuit control panel 10 comprises a base or sheet of insulating or dielectric material 12 having lines or strips of conductive material 13 which form the printed circuits. Thus, the former exacting, time-consuming and expensive wiring is avoided, and the conductive material 13 takes the place of the wiring formerly employed in such panels, in a manner now well known in the art. At the present time, such panels are produced by established manufacturers according to designs submitted by purchasers.

Figures 2, 3, 4:
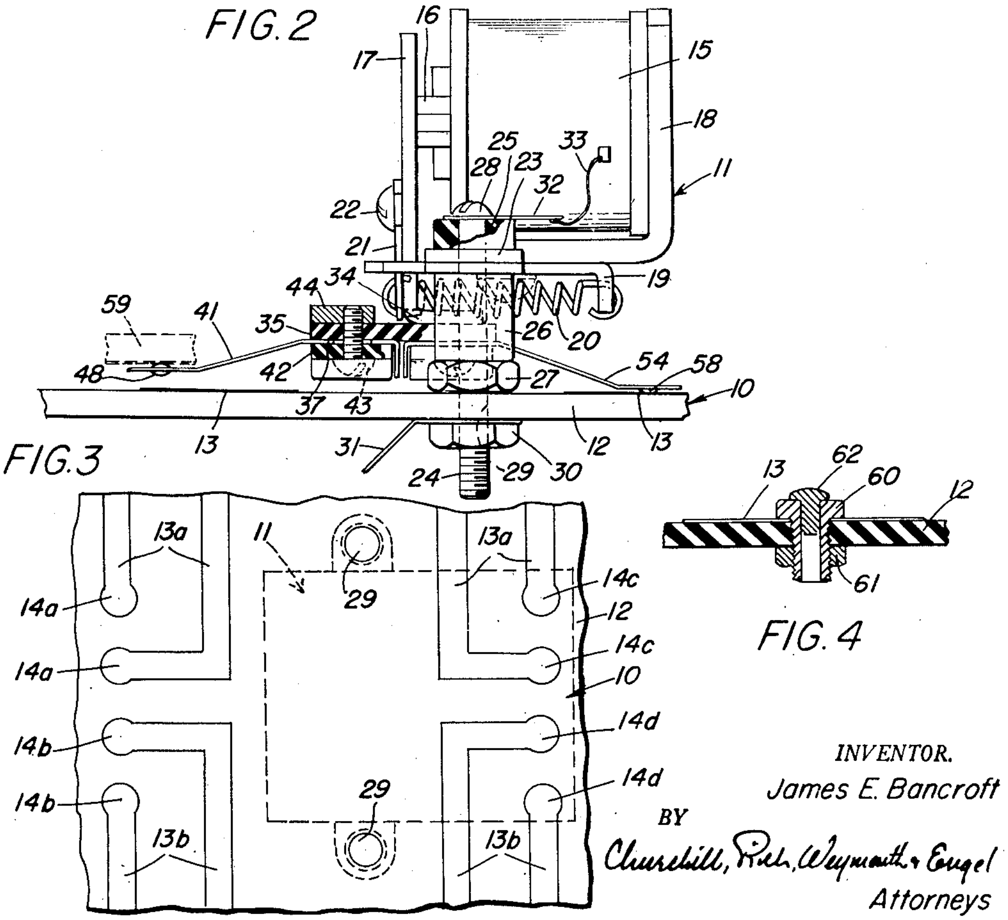
Fig. 2 is a side elevation of the relay illustrated in Fig. 1 together with a printed circuit control panel to which the relay is attached.
Fig. 3 is a plan view, on a slightly reduced scale, of the portion of the printed circuit control panel on which the relay is mounted as shown in Fig. 2, with the relay removed, the position of the modified relay being shown in dotted lines.
Fig. 4 is a fragmental section of a printed circuit control panel illustrating one method of applying a contact point thereto.

As shown in Fig. 3, a number of printed circuits are applied to the upper surface of the base 12, and each circuit is broken between fixed terminals thereof. Thus, for example, a printed circuit 13*a* provides fixed terminals 14*a*, 14*a* which may be suitably bridged by conductive means to close the circuit. Similarly, a printed circuit 13*b* upon the base 12 provides fixed terminals 14*b*, 14*b* which may be bridged in like manner to close that circuit. Like printed circuits 13*a* and 13*b* are applied to the base 12, on the opposite side of the position of the relay 11 on the panel, and respectively provide fixed terminals 14*c*, 14*c* and 14*d*, 14*d* thereof. In the embodiment illustrated it is preferred to position the fixed terminals 14*a* and 14*b* on one side of the relay in line with one another, and to position similarly the fixed terminals 14*c* and 14*d* on the opposite side of the relay, all for a purpose which will later appear.

It is here noted that Figs. 2 and 3 illustrate but one section of a control panel. Ordinarily, a control panel will consist of a number of such sections with a relay attached to each.

The relay 11 is basically of usual construction, embodying an electromagnet 15, having a pole piece 16, and an armature 17 movable in response to energization of the magnet. The magnet 15 is carried by the usual frame 18, to which a bracket 19 is fixed for pivotally supporting the armature 17 in known manner and for attachment of one end of a coil spring 20 whereby the armature is moved away from the pole piece 16 when the magnet is de-energized. A plate 21, fixed to the armature 17, as by screws 22, 22, extends below the bracket 19, and the end of the coil spring 20 opposite to that which is attached to the bracket 19 is connected to the lower end of the plate 21. Accordingly, when the magnet 15 is not energized, the coil spring 20 moves the armature 17 away from the pole piece 16. When the magnet 15 is energized, it draws the armature 17 to the pole piece 16, overcoming the action of the coil spring 20.

In order that the relay 11 may be carried by the control panel 10, special means is provided for attaching the relay to the panel. In the embodiment here illustrated, a pair of ears 23, 23 are fixed to the frame 18, one on each side of the solenoid 15, and a mounting bolt 24 passes through a central opening in each ear 23 and through the panel 10 to attach the relay to the panel. As here illustrated, each mounting bolt 24 extends through a ring 25 of insulating material disposed above an ear 23, through the ear, from which it is insulated in known or convenient manner, and through a cylinder 26 of insulating material. Beneath the cylinder 26, a nut 27 is screwed upon the threads of the mounting bolt 24. The bolt has a slotted head 28; and by screwing the nut 27 tightly against the cylinder 26 the mounting bolt may be fixed firmly to the relay 11.

In order to attach the relay 11 to the control panel 10, it is merely necessary to pass the threaded ends of the mounting bolts 24 through suitable openings 29 in the panel and to tighten fixing nuts 30 upon their threads and against the under side of the panel 10. Thus, the panel is firmly held between the nuts 27 and 30 on each mounting bolt and the relay is firmly attached to the panel.

The mounting bolts 24, 24 provide convenient means for connecting the relay 11 in the relay actuating circuit, and one such arrangement is illustrated in the drawings. Here the conductors 31 of the relay control circuit are clamped to the side of the control panel, opposite to that upon which the relay is mounted, by the fixing nuts 30, there making good electrical connection with the mounting bolts 24. Conducting soldering lugs 32, 32 are clamped between the heads 28 of the mounting bolts 24 and the rings 25, and the short leads 33, 33 of the solenoid 15 are soldered or otherwise electrically connected to the lugs 32. Obviously, other electrical connections through the mounting bolts might be substituted for those illustrated and described. Instead of the conductors 31, a printed circuit may be provided, on either side of panel 12, to make contact with bolts 24 through the nuts 27 or 30.

It is to be noted that the relay 11, unlike the usual relay, has no fixed contacts. The relay 11 carries movable contacts only. The base 12 carries all of the fixed relay contacts. In the embodiment here disclosed, the lower end of the armature 17 is bent substantially at a right angle to provide a portion 34 extending beneath the magnet 15. The movable relay contacts are connected to the bent portion 34 of the armature. Thus, a block of insulating material 35 is fixed to the lower horizontal surface of the bent portion 34 of the armature 17 (as shown in Fig. 2) in any suitable manner (not shown). Bridging members 36 and 37 (Fig. 1) carrying substantially parallel contact fingers 38, 39, and 40, 41, respectively, extending on opposite sides of the armature 17, are held firmly between the block of insulating material 35 and an auxiliary block of insulating material 42. To this end, bolts 43 extend through both blocks and are threaded into a metal plate 44 beyond the block of insulating material 35. The bridging members are, of course, insulated from the bolts 43, in any known or convenient manner, to prevent short circuiting through the metal plate 44.

The contact fingers 38, 39, 40 and 41 are respectively provided with contact buttons 45, 46, 47 and 48, and the fingers are of such length and spacing that the contact buttons may meet the fixed terminals **14*a*, 14*a*, 14*b*, 14*b*, respectively, of the printed circuit. Bridging members 49 and 50 (Fig. 1), similar to the bridging members 36 and 37, are fixed to the block of insulating material 35 in like manner, and carry substantially parallel contact fingers 51, 52 and 53, 54, respectively, all extending oppositely in direction to the fingers 38, 39, 40 and 41. Contact buttons 55, 56, 57 and 58 are provided adjacent the ends of the contact fingers 51, 52, 53 and 54, respectively, in position to meet the fixed terminals 14*c*, 14*c*, 14*d* and 14*d***, respectively.

When the modified relay 11 is attached to the control panel 10 in the manner described, the block of insulating material 35 and its associated parts are clear of the control panel and will not touch the panel as the armature 17 is moved. In order that the contact buttons 45, 46, 47 and 48 may meet their respective fixed terminals when the magnet 15 is de-energized and the coil spring 20 moves the armature 17 and the block of insulating material 35 in a counter-clockwise direction as viewed in Fig. 2, the contact fingers 38, 39, 40 and 41 are bent downwardly beyond the block 35 by a suitable amount, as may be seen in Fig. 2. The contact fingers 45, 46, 47 and 48 are similarly bent downwardly beyond the block 35 in order that their contact buttons may meet their respective fixed contacts when the energized solenoid 15 draws the armature 17 against its shaded pole 16. Fig. 2 shows the relay in energized position.

From the foregoing, the operation of the apparatus will be apparent. With the modified relay 11 attached as a unit to the control panel 10 in the manner described, it will when energized move the contact buttons 55 and 56 to meet the fixed terminals **14*c* and 14*c*. Also the contact buttons 57 and 58 will be moved to meet the fixed terminals 14*d* and 14*d***.

The relay will thus close the right hand (Fig. 3) printed circuit **13*a* between its fixed terminals 14*c* and 14*c* through the contact finger 51, the bridging member 49 and the contact finger 52. In the same position, the relay will close the right hand printed circuit 13*b* between its fixed terminals 14*d* and 14*d* through the contact finger 53, the bridging member 50 and the contact finger 54**.

With the relay 11 in the position just described, that is to say the magnet 15 being energized and the armature 17 against the pole 16, the contact fingers 38, 39, 40 and 41 are lifted clear of the fixed terminals **14*a*, 14*a*, 14*b* and 14*b*. Accordingly, the left hand printed circuits 13*a* and 13*b*** remain open.

When the magnet 15 is de-energized, the coil spring 20 draws the armature 17 away from the pole 16 and the contact fingers 51, 52, 53 and 54 are lifted from their respective fixed terminals. The same movement of the armature 17 turns the contact fingers 38, 39, 40 and 41 toward the control panel 10 until the contact buttons 45, 46, 47 and 48 of the respective contact fingers meet the respective fixed terminals **14*a*, 14*a*, 14*b* and 14*b*. Thus the left hand printed circuit 13*a* is closed through the contact finger 38, the bridging member 36 and the contact finger 39; the left hand printed circuit 13*b* through the contact finger 40, the bridging member 37 and the contact finger 41**.

Clearly the unit just described may be multiplied upon a single panel. Clearly, also, other means might be provided for bridging the fixed terminals of each printed circuit responsive to action of the relay 11. Moreover, the bridging action of each pair of contact fingers may be doubled if, as illustrated in broken lines in Fig. 2, an additional printed circuit panel or contact bar 59 be suitably mounted above the control panel 10, and the adjacent contact buttons be caused to project on both sides of the contact fingers. By means of such arrangement, one or more printed circuits may be closed by the same group of contact fingers each time the relay 11 is energized or de-energized.

Finally, fixed terminals may be provided for printed circuits for heavy duty circuits as shown in Fig. 4. Here the printed circuit 13 and the base 12 are pierced. A hollow bolt 60 of conductive material extends through the printed circuit and the base with its head in electrical contact with the printed circuit; and a nut 61, threaded upon the bolt 60, bears upon the opposite surface of the base 12 to draw the bolt head tightly against the printed circuit. A button 62 of suitable contact material, such as silver, is drifted or otherwise tightly inserted into the hollow bolt 60 to extend above its head. This construction makes the contact easily replaceable. The resiliency of the coacting contacting finger causes the contact button thereon to make wiping contact with the button 62 in the hollow bolt 60. Very good electrical connection results.

The forms of the invention herein disclosed are presented merely as examples of how the invention may be employed. Other forms, embodiments and applications of the invention, coming within the proper scope of the appended claims, will of course suggest themselves to those skilled in the electrical art.

What I claim is:

1. Electrical switching means comprising, in combination, a base of insulating material, printed circuits on said base comprising conductive strips terminating in spaced relation and forming normally open circuits, hollow metal studs secured in said base in contact with the ends of said strips, removable contact elements inserted in said studs and serving as fixed contacts, said panel having mounting holes adjacent said fixed contacts, a modified relay comprising an electromagnet and a cooperating armature and a movable contact member carried by said armature adapted to bridge a pair of said fixed contacts and a pair of mounting bolts adapted to enter said holes, and means for securing said bolts in said holes to support said relay on said base with said contact member positioned in juxtaposition to said fixed contacts for engagement therewith.

2. Electrical switching means comprising, in combination, a base of insulating material, printed circuits on said base comprising conductive strips terminating in spaced relation and forming normally open circuits, the ends of said strips providing fixed contacts, said panel having mounting holes adjacent said fixed contacts, a modified relay comprising an elctromagnet and a cooperating armature and at least one pair of resilient movable contact arms carried by said armature and a pair of conductive mounting bolts adapted to enter said holes, means for securing said bolts in said holes to support said relay on said base with said arms positioned in juxtaposition to said fixed contacts for engagement therewith, said resilient arms being conductively coupled in pairs whereby engagement of a pair of fixed contacts by a pair of said arms closes a normally open circuit, said electromagnet having terminal leads connected to said mounting bolts, said printed circuits including conductive strips arranged to be engaged by and electrically connected to said bolts whereby said electromagnet is connected in circuit by being mounted on said base.

3. Electrical switching means comprising, in combination, a base of insulating material, printed circuits on said base comprising conductive strips terminating in spaced relation and forming normally open circuits, the ends of said strips providing fixed contacts, said panel having mounting holes adjacent said fixed contacts, a modified relay comprising an electromagnet and a cooperating armature and at least one resilient bridging means carried by said armature and a pair of conductive mounting bolts adapted to enter said holes, means for securing said bolts in said holes to support said relay on said base with said bridging means positioned in juxtaposition to said fixed contacts for engagement therewith, whereby engagement of a pair of fixed contacts by said bridging means closes a circuit, said electromagnet having terminal leads connected to said mounting bolts, said printed circuits including conductive strips arranged to be engaged by and electrically connected to said bolts whereby said electromagnet is connected in circuit by being mounted on said base.

References Cited in the file of this patent

UNITED STATES PATENTS

| | | |
|---|---|---|
| 800,179 | Souder | Sept. 26, 1905 |
| 1,741,409 | Dunn | Dec. 31, 1929 |
| 2,066,511 | Arlt | Jan. 5, 1937 |
| 2,152,042 | Grandstaff | Mar. 28, 1939 |
| 2,391,400 | Ebert | Dec. 25, 1945 |
| 2,405,319 | McMaster et al. | Aug. 6, 1946 |
| 2,616,994 | Luhn | Nov. 4, 1952 |
| 2,702,841 | Bernstein | Feb. 22, 1955 |